United States Patent Office 3,574,787
Patented Apr. 13, 1971

3,574,787
ACETOACETIC ACID ESTERS AS ADDITIONAL ACCELERATORS FOR POLYESTER MOULDING AND COATING MATERIALS
Hans Rudolph, Krefeld-Bockum, and Joachim Schneider and Manfred Patheiger, Krefeld-Uerdingen, and Clemens Niehaus, Krefeld, Germany, assignors to Farbenfabriken Bayer Aktiengesellschaft, Leverkusen, Germany
No Drawing. Continuation-in-part of application Ser. No. 690,106, Dec. 13, 1967. This application June 9, 1969, Ser. No. 831,780
Claims priority, application Germany, June 11, 1968, P 17 69 578.2
Int. Cl. C08f 1/62, 21/02, 21/04
U.S. Cl. 260—863                                4 Claims

ABSTRACT OF THE DISCLOSURE

The invention relates to moulding and coating compositions being rapidly hardenable at room temperature after the addition of hydroperoxide as polymerisation catalyst comprising mixtures of unsaturated polyesters derived from $\alpha,\beta$-ethylenically unsaturated dicarboxylic acids and polyalcohols, and monomeric ethylenically unsaturated compounds copolymerisable therewith, said mixtures containing a cobalt salt as accelerator and acetoacetic acid esters which contain once or several times the radical $$CH_3—O—CH_2—CO—O—R—$$

attached to a hydroxyl group, ether oxygen, sulfur, the —CH=CH— group or nitrogen, R meaning a divalent hydrocarbon radical having up to 3 carbon atoms in the chain.

---

This is a continuation-in-part of our copending application Ser. No. 690,106, filed Dec. 13, 1967 and now abandoned.

It is known that moulding and coating materials of unsaturated polyesters and copolymerisable monomers having a content of hydroperoxides, preferably ketone hydroperoxides, as polymerisation catalysts and of cobalt compounds as accelerators, harden at room temperature to give mouldings or coats.

It is further known to use additional accelerators, besides the cobalt compounds. Such additional accelerators are intended not only to support the gelling of the materials, but also to accelerate their complete hardening. Working with additional accelerators has mainly been accepted in the field of lacquers and varnishes, with a view to a contemporary assembly line process as well as because the resultant more rapid hardening leads to coats of good stability, i.e. with an even, structure-free surface.

As additional accelerators, acetoacetic acid ethyl ester and acetyl-acetone have been proposed, inter alia (cf. Deutsche Farbenzeitschrift 14, No. 11, page 442 [1960]). Compared with some other additional accelerators which have already been proposed, the two compounds have the advantage, as substances which are liquid at room temperature and well compatible with the moulding or coating materials, of being easily admiscible. They can therefore also be applied by the final user without difficulties and technical expenditure.

However, acetoacetic acid ethyl ester is not very effective. In order to achieve a satisfactory acceleration, 4–6 percent by weight, referred to the hardenable materials, must be used; it is known that these amounts lead to discoloured hardened products and have an undesirable plasticising effect. It is true that acetyl-acetone is more effective, but it also leads to extremely strong discolourations, even at lower concentrations.

Surprisingly, some acetoacetic acid esters have now been found, which do not have the aforesaid disadvantages. They are compounds which contain once or several times the radical $$CH_3—CO—CH_2—CO—O—R—$$

attached to the hydroxyl group, ether oxygen, sulfur, to the —CH=CH— group or to nitrogen, R meaning a divalent hydrocarbon radical having up to 3 carbon atoms in the chain.

The object of the invention, therefore, comprises the use of acetoacetic acid esters of the type defined above as additional accelerators for polyesters moulding and coating materials comprising mixtures of unsaturated polyesters and copolymerisable monomeric ethylenically unsaturated compounds and containing hydroperoxide, preferably a ketone hydroperoxide, as polymerisation catalyst and a cobalt salt as accelerator and which may be adjusted to "non-greening."

The materials modified according to the invention are not only characterised by their high stability in storage, before the addition of the peroxide, even after the addition of the cobalt accelerator, and, after the addition of the peroxide, by rapid gelling and hardening to give, for example, coats of good stability, they also have the advantage of not affecting the colour of the hardened products. The new additional accelerators are therefore used with particular advantage for those materials which have been adjusted by known measures to "non-greening." Admittedly, non-greening materials with short gelling times have already been described in U.S. Pat. No. 3,239,581 and in U.S. Pat. No. 3,274,291. However, the amine and phosphine additional accelerators there mentioned have the disadvantage of accelerating only the gelling, but not the hardening to the desired extent.

The acetoacetic acid esters of the type defined above, wherein the cited radical is attached to OH, include, for example, the monoacetoacetic acid esters of glycols such as propane-diol-1,2 and -1,3 and butane-diol-1,2 and -1,3, the mono- and diesters of trihydric alcohols such as glycerol and trimethylolpropane, and the mono-, di- and triesters of pentaerythritol.

Esters wherein the radical cited above is attached to ether oxygen or sulfur include, for example, the monoesters of etherified glycols such as of ethyleneglycol-monomethyl- and -ethylether, of 1-hydroxy-2-methoxy-propane, and of 1-hydroxy-3-methoxy-butane and of thiodiglycol.

Esters wherein the radical cited above is attached to —CH=CH— include, for example, the esters of allylalcohol and benzylalcohol.

Esters wherein the radical cited above is attached to nitrogen include, for example, esters of alkanolamines such as of 1-hydroxy-2-dimethyl-amino-ethane, of 1-dimethyl-amino-2-hydroxy-propane, and of 1-hydroxy-2-N-morpholinoethane.

The compounds are normally sufficiently effective already in amounts of about 1 to about 5 percent by weight, referred to the moulding and coating materials. Compounds with $R=—C_2H_4—$ are preferred. Compounds having free hydroxyl groups are somewhat more effective than products containing ether groups; compounds containing the group $CH_3—CO—CH_2—CO—O—R—$ attached to nitrogen are particularly effective. Of these compounds, amounts of about 0.2 percent by weight, or even less, will frequently suffice to achieve a satisfactory accelerating effect.

The new additional accelerators can be used by themselves or in mixtures with one another or in combination with additional accelerators of different type.

Unsaturated polyesters in the meaning of the invention comprise, as usual (see e.g. the book by I. Bjorksten "Polyesters and Their Application," Reinhold Pattishins Corp., New York, 1956) polycondensation products obtained from α,β-unsaturated dicarboxylic acids, such as maleic acid, fumaric acid, itaconic acid, mesaconic acid and citraconic acid, with polyalcohols, such as ethylene glycol, diethylene glycol, propane-, butane-, hexane-diol, trimethylol-propane and pentaerythritol. Part of the unsaturated dicarboxylic acids can be replaced with saturated polybasic carboxylic acids, for example, succinic acid, glutaric acid, adipic acid, phthalic acid, tetrachlorophthalic acid, hexachloroendomethylene-tetrahydrophthalic acid and trimellitic acid. Other modifications are possible by the incorporation of monohydric alcohols, such as butanol and tetrahydrofurfuryl alcohol, and of monobasic acids, such as benzoic acid, oleic acid, linseed oil fatty acid and dehydrated ricinoleic fatty acid.

There may also be mentioned mixtures of unsaturated polyesters with monomeric unsaturated compounds which contain, besides the radicals of α,β-unsaturated dicarboxylic acids as constituents of the polyesters, also β,γ-unsaturated ether radicals, be it likewise as constituents of the polyesters, for example, according to published German patent application No. 1,024,654, be it as constituent of other mixture components, for example, according to German patent specification No. 1,067,210 and published German patent application No. 1,081,222, which are not only copolymerisable but also air-hardening.

Suitable monomeric unsaturated compounds which can be copolymerised with the unsaturated polyesters are, for example, vinyl compounds, such as styrene, vinyl-toluene and divinyl-benzene; furthermore, vinyl esters, such as vinyl acetate; also unsaturated carboxylic acids and their derivatives, such as acrylic acid, acrylic ester and acrylonitrile; further methacrylic acid and its corresponding derivatives; allyl esters, such as allyl acetate, allyl acrylate, phthalic acid diallyl ester, triallyl phosphate and triallyl cyanurate.

To increase the stabiity in storage, the moulding masses may contain known inhibitors, for example, p-benzoquinone, 2,5-di-tert.-butylquinone, hydroquinone, tert.-butylpyrocatechol, 3-methyl-pyrocatechol and 4-ethyl-pyrocatechol; and also copper compounds, e.g. copper naphthenate.

The customary, usually well soluble cobalt compounds, such as cobalt octoate and cobalt naphthenate, can be used as cobalt accelerators for the process according to the invention.

As peroxide initiators, the hydroperoxides customarily used are recommended, for example, comenel hydroperoxide, tetrahydronaphthalene hydroperoxide and tert.-butyl hydroperoxide, but preferably ketone hydroperoxides, such as cyclohexanone hydroperoxide and methyl ethyl ketone hydroperoxide.

The parts and percentages given in the following examples are parts by weight and percent by weight.

EXAMPLE 1

(a) Preparation of the polyester

An unsaturated polyester with an acid number 47, prepared by condensation of 152 parts maleic acid anhydride, 141 parts phthalic acid anhydride and 195 parts propanediol-1,2 and stabilised by the addition of 0.045 part hydroquinone, is dissolved in styrene to give a 65% solution.

(b) Preparation of the varnish mixture 100 parts of this polyester are diluted with 20 parts styrene. The solution is then mixed with a 1.5% cobalt naphthenate solution in toluene (Co-content 2.2%) and 0.1% paraffin (M.P. 52–53° C.).

(c) Working up of the varnish mixture

The varnish mixture is applied in an amount of 500 g./sq.m. to a light-coloured wood veneer which was previously bleached with an alkali-activated bleaching agent and coated with 100 g./sq.m. contact primer. The contact primer consists of 30 parts nitro-cellulose (butanol-moist), 120 parts ethyl acetate, 35 parts butyl acetate and 20 parts cyclohexanone peroxide powder (95%).

The gelling times and stability of the varnishes modified according to the invention, compared with unmodified material, are stated in the following Table 1.

The stability was tested, after 24 hours' drying, on a ground and polished coat at room temperature and an atmospheric humidity of 65%. The marks 1 (very good), 2 (good), 3 (satisfactory) and 4 (unsatisfactory) serve for evaluating the stability. The concentrations of the additional accelerators stated in the table refer to the resin materials.

TABLE 1

| Additive | Gelling time, min. | Stability |
|---|---|---|
| Without additive | 9 | 4 |
| 1% acetoacetic acid ethyl ester | 9 | 3–4 |
| 1% acetoacetic acid ester of 1-hydroxy-2-methoxyethane | 7 | 2 |
| 0.2% monoacetoacetic acid ester of propane-diol-1,2 | 8 | 3 |
| 0.6% monoacetoacetic acid ester of propane-diol | 7 | 2 |
| 1.0% monoacetoacetic acid ester of propane diol | 6 | 1–2 |
| 1.0% acetoacetic acid ester of 1-hydroxy-2-butyoxyethane | 8 | 2–3 |
| 0.6% monoacetoacetic acid ester of butane-diol-1,3 | 7 | 2 |
| 1.0% acetoacetic acid ester of 1-hydroxy-3-methoxybutane | 8 | 2–3 |

EXAMPLE 2

The varnish mixture described in Example 1 is mixed with 0.01% phosphoric acid mono-n-butyl ester and 0.014% phosphoric acid di-n-butyl ester in order to prevent greening. The process is otherwise carried out as described in Example 1.

TABLE 2

| Additive | Gelling time, min. | Stability | Colour of coats [1] |
|---|---|---|---|
| Without additive | 10 | 4 | Pale pink. |
| 0.17% triphenyl-phosphine | 8 | 4 | Do. |
| 1.0% acetoacetic acid ester of 1-hydroxy-2-methoxyethane | 8 | 2 | Do. |
| 0.1% acetoacetic acid ester of 1-hydroxy-2-dimethylamino-ethane | 8 | 2–3 | Do. |
| 0.3% acetoacetic acid ester of 1-hydroxy-2-dimethylamino-ethane | 7 | 2 | Pale pink, almost colourless. |

[1] To determine the colour, samples of the coats of 4 cm. length are examined by transmitted light.

EXAMPLE 3

(a) Preparation of the polyester

An unsaturated polyester with the acid number 47, which has been prepared by condensation of 152 parts by weight maleic acid anhydride, 141 parts by weight phthalic acid anhydride and 195 parts by weight propanediol-1,2 and has been stabilised by the addition of 0.045 part by weight hydroquinone, is dissolved in styrene to give a 65% solution.

(b) Preparation of the varnish solution 100 parts by weight of this polyester are diluted with 20 parts by weight styrene. The solution is then mixed with 1.5 parts by weight of a cobalt naphthenate solution in toluene (Co content 2.2 percent by weight), 0.1 percent by weight paraffin (M.P. 52–53° C.) and optionally with 1.5 percent by weight diacetoacetic acid ester of thiodiglycol.

(c) Working up of the varnish mixture

The varnish mixture is applied in an amount of 500 g./sq. m. to a light-coloured wood veneer which was previously bleached with an alkali-activated bleaching agent and coated with 100 g./sq. m. of active primer. The active primer consists of a coating formed from a solution of 30 parts by weight nitrocellulose (butanol-moist), 120 parts by weight ethyl acetate, 35 parts by weight butyl acetate and 20 parts by weight of cyclohexanone peroxide powder (95%).

The following table shows the gelling time and the stability of a varnish modified according to the invention, in comparison with unmodified material.

TABLE 3

| Additive | Gelling time, min. | Stability |
|---|---|---|
| Without additive | 9 | 4 |
| 1.5% diacetoacetic acid ester of thiodiglycol | 5 | 2-3 |

We claim:

1. A moulding and coating composition having high storage stability and being rapidly hardenable at room temperature after the addition of a hydroperoxide polymerization catalyst, said composition comprising a mixture of an unsaturated polyester of an $\alpha,\beta$-ethylenically unsaturated dicarboxylic acid and a polyalcohol, an ethylenically unsaturated monomer copolymerizable therewith, a cobalt salt accelerator and, as an additional accelerator, from about 0.2 to about 5% by weight, based on the weight of said moulding and coating composition, of a monoacetoacetic acid ester of an alkane diol having up to 3 carbon atoms between the hydroxy groups thereof, a mono- or diacetoacetic acid ester of a trihydric alcohol having up to 3 carbon atoms between the hydroxy groups thereof, a mono-, di- or triacetoacetic acid ester of pentaerythritol, a monoacetoacetic acid ester of an etherified glycol having up to 3 carbon atoms between the hydroxy group and the ether oxygen atom thereof, the acetoacetic acid ester of allyl alcohol, the acetoacetic acid ester of benzyl alcohol or the acetoacetic acid ester of a monoalkanol amine having up to 3 carbon atoms between the hydroxy group and the amino group thereof.

2. The moulding and coating composition of claim 1 wherein said additional accelerator is a monoacetic acid ester of an alkane diol having 2 carbon atoms between the hydroxy groups thereof.

3. The moulding and coating composition of claim 1 wherein said additional accelerator is a mono- or diacetoacetic acid ester of glycerol.

4. The moulding and coating composition of claim 1 wherein said additional accelerator is an acetoacetic acid ester of a monoalkanol amine having up to 3 carbon atoms between the hydroxy group and the amino group.

References Cited

UNITED STATES PATENTS

| 3,239,581 | 3/1966 | Raichle et al. | 260—863 |
| 3,249,574 | 5/1966 | Meyer et al. | 260—863 |
| 3,398,213 | 8/1968 | Chetakian | 260—863 |

WILLIAM H. SHORT, Primary Examiner

R. J. KOCH, Assistant Examiner

U.S. Cl. X.R.

260—22, 864, 865, 866